United States Patent [19]

Yanagida

[11] Patent Number: 4,481,548
[45] Date of Patent: Nov. 6, 1984

[54] MAGNETIC RECORDING AND REPRODUCING APPARATUS

[75] Inventor: Tuneo Yanagida, Tokyo, Japan

[73] Assignee: Olympus Optical Co., Ltd., Tokyo, Japan

[21] Appl. No.: 531,184

[22] Filed: Sep. 9, 1983

Related U.S. Application Data

[63] Continuation of Ser. No. 308,828, Oct. 5, 1981.

[30] Foreign Application Priority Data

Oct. 17, 1980 [JP] Japan .................... 55-145116

[51] Int. Cl.³ ............... G11B 5/09; G11B 5/00
[52] U.S. Cl. .......................... 360/44; 360/32
[58] Field of Search ............... 360/32, 110, 44

[56] References Cited

U.S. PATENT DOCUMENTS 4,390,907  6/1983  Fujiwara .................... 360/32

OTHER PUBLICATIONS

"Magnetic Tape Instrumentation"-G. L. Davis, McGraw Hill Book Co. Inc., 1961, p. 46.

Primary Examiner—Vincent P. Canney
Attorney, Agent, or Firm—Frishauf, Holtz, Goodman & Woodward

[57] ABSTRACT

A still video signal is modulated to a PDM signal by a pulse duration modulator. The PDM signal is recorded by a perpendicular magnetic recording head on a recording medium of perpendicular magnetic anisotropy according to the perpendicular magnetic recording method. The PDM signal recorded on the recording medium is reproduced by a perpendicular magnetic reproducing head.

6 Claims, 5 Drawing Figures

MAGNETIC RECORDING AND REPRODUCING APPARATUS

This application is a continuation of application Ser. No. 308,828, filed Oct. 5, 1981.

BACKGROUND OF THE INVENTION

The present invention relates to a magnetic recording and reproducing apparatus for recording and reproducing a signal which is pulse-modulated in analog manner.

When information is transmitted to the transmission line in a transmission system for transmitting information of still images, serial information is resolved every unit of image elements. Accordingly, when the signal transmitted is formed every unit of image elements, a signal process such as a transmission speed changing operation can be easily achieved. Pulse modulation is well known as a signal modulation method suitable for such transmission. Pulse modulation of analog type such as pulse phase modulation (PPM) and pulse width modulation (PWM) is better than some other pulse modulation methods to achieve narrow-band transmission. It has been reported that pulse duration modulation (PDM) can enhance pulse transmission density better than PPM because the former needs no reference pulse. A transmission method using PDM is intended to correspond in analog amount to pulse duration when an analog signal is digitized and transmitted. Therefore, fluctuations in pulse duration during transmission influences the S/N ratio of the signal directly, and it is therefore extremely important to accurately keep this pulse duration. Upon recording a signal transmitted according to the PDM method, the modulated signal may be recorded by FM modulation or the like on a recording medium. But, this requires a complicated additional circuit. Magnetic recording is an excellent method for recording a large amount of information, but when a PDM signal is recorded using the longitudinal recording method now widely employed, various problems are caused. Because the amount of peak shift is large according to the longitudinal recording method, recorded information does not correspond to reproduced information in the case where recording density dependence is present. In the case of a PDM signal, for example, pulse duration is substantially changed by recording current and density to thereby change contents of information.

SUMMARY OF THE INVENTION

The present invention relates to a magnetic recording and reproducing apparatus capable of recording a PDM signal on a recording medium according to the perpendicular magnetic recording method.

According to the present invention a magnetic recording and reproducing apparatus comprises a perpendicular magnetic recording head for recording a PDM signal in the perpendicular direction on a recording medium of perpendicular magnetic anisotropy whose magnetic anisotropy dispersion angle is small, and a reproducing head for reproducing information recorded on the recording medium.

DETAILED DESCRIPTION OF THE PREFERRED EMBODIMENT

The present invention uses the perpendicular magnetic recording method instead of the conventional longitudinal recording method, and the peak shift characteristic in the perpendicular magnetic recording method will now be described. Peak shift represents to what extent positions of reproducing pulses correspond to those of recording pulses (or to the rise and fall of recording current). According to FIG. 1 which shows in a graph the peak shift characteristic of perpendicular magnetic recording, amounts $\Delta XP$ of peak shift are almost certain relative to magnitudes I(mA) of recording current. This characteristic graph was obtained using a two-bit pattern and providing that the thickness $T_{rec}$ of the recording medium is 3.2 $\mu$m, the head gap $G_{rep}$ is 1.0 $\mu$m and the recording density D is 30KBPI. FIG. 2 shows in a graph the relation between amounts of peak shift and recording densities. According to this characteristic graph shown in FIG. 2, amounts of peak shift depend upon the reproducing system and in the case where a ring head is used as reproducing head, for example, the better amounts of peak shift can be improved the narrower the gap of the head becomes. This characteristic graph shown in FIG. 2 was obtained using a two-bit pattern and providing that $T_{rec}$ is 3.2 $\mu$m and the head gap is 2.2 $\mu$m, 1.0 $\mu$m and 0.5 $\mu$m.

Figure 1:
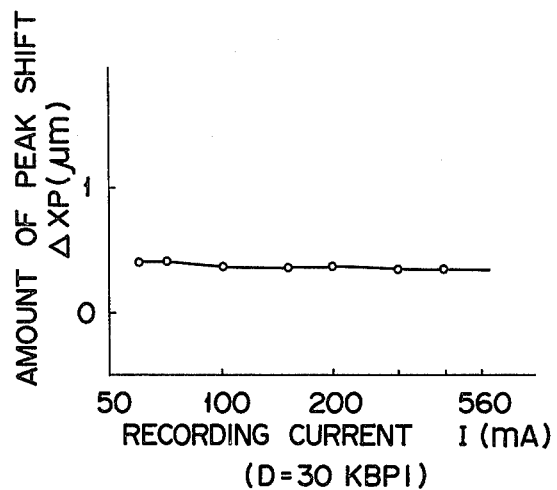
FIG. 1 is a characteristic graph showing the relation between peak shift amounts and recording current in a perpendicular magnetic recording operation.
Figure 2:
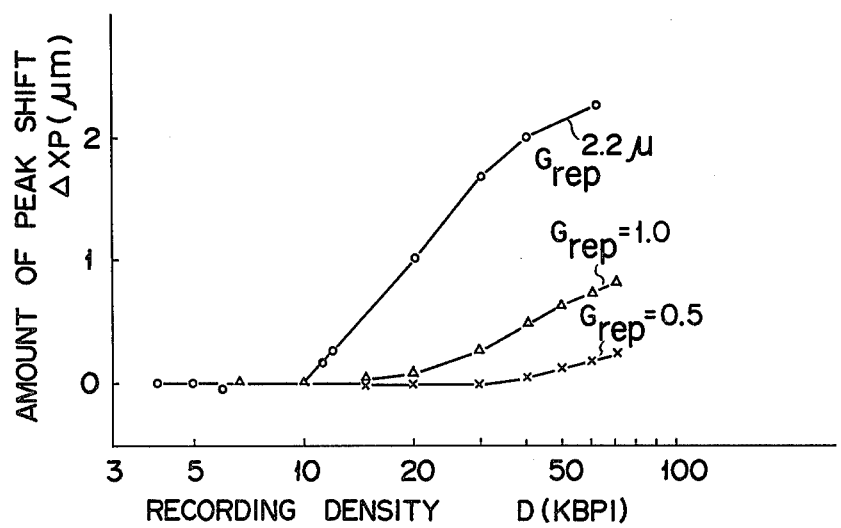
FIG. 2 is a characteristic graph showing the relation between peak shift amounts and recording densities.

It will be understood from the graphs of FIGS. 1 and 2 that the amounts of peak shift in recording and reproducing systems according to the perpendicular magnetic recording are extremely small and that most of these amounts almost depends upon the reproducing system. Therefore, when the smallest pulse duration of a pulse duration modulated (PDM) signal is set in a limit determined by the reproducing system, a PDM signal can be recorded directly on a magnetic recording medium.

Figure 3:
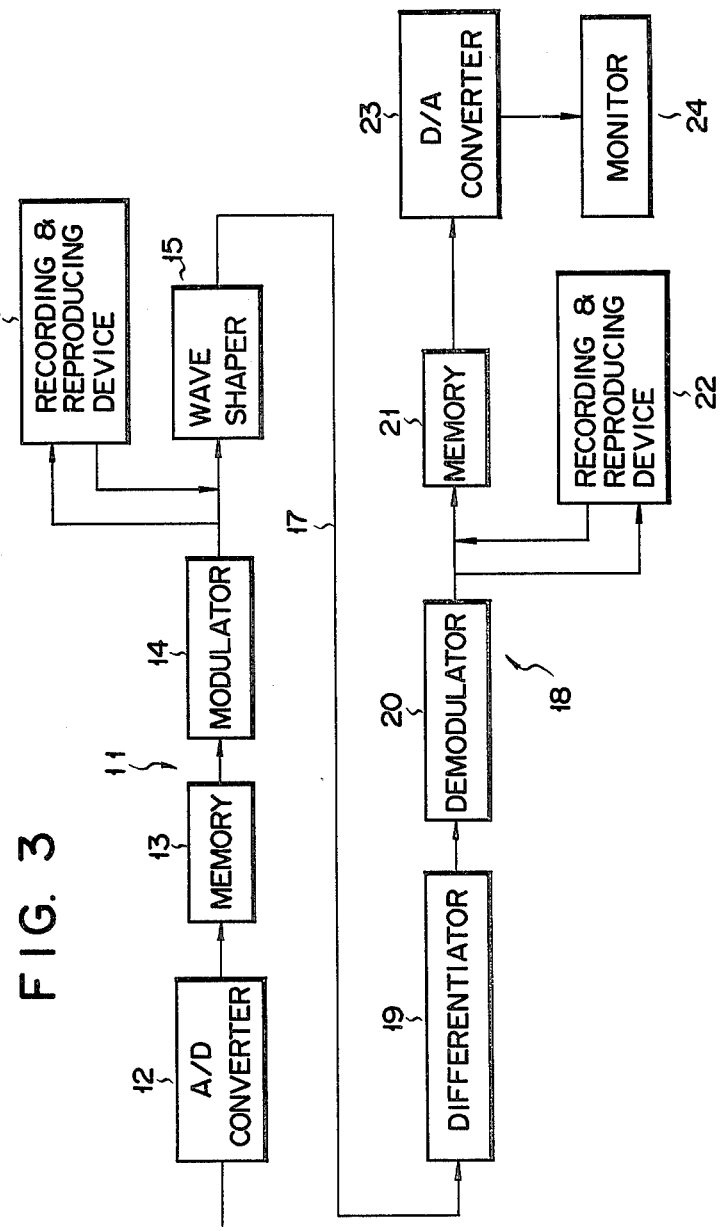
FIG. 3 is a block circuit diagram showing a transmission system to which is connected a magnetic recording and reproducing apparatus according to the present invention.

The present invention has resulted from the above-mentioned reason, and a magnetic recording and reproducing apparatus according to the present invention will be now described. FIG. 3 shows a PDM transmission system to which the magnetic recording and reproducing apparatus is connected. An A/D converter 12 for converting a still video signal, for example, to a digital signal is connected to a memory 13 in a transmitter 11. The memory 13 is connected to a wave shaper 15 through a modulator 14, to the output terminal of which is connected a recording and reproducing device 16. The output terminal of wave shaper 15 is connected via a transmission line 17 to a differentiator 19 of a receiver 18. The output terminal of differentiator 19 is connected via a demodulator 20 to a memory 21. To the output terminal of demodulator 20 is connected a recording and reproducing device 22. The output terminal of memory 32 is coupled via a D/A converter 23 to a monitor 24.

The still video signal which is converted to a digital signal by the A/D converter 12 in the PDM transmission system is stored in the memory 13. The digital video signal read out of memory 13 is modulated to a PDM signal by the PDM modulator 14. The PDM signal is shaped by the wave shaper 15 to have a waveform suitable for transmission and then applied to the transmission line 17. The PDM signal is also recorded by the recording and reproducing device 16 if necessary. The recording and reproducing device 16 will be later described in detail. The PDM signal is applied via the transmission line 17 to the differentiator 19 of the receiver 18 and differentiated by the differentiator 19 to detect peak values of the PDM signal. The differentiated signal is demodulated by the demodulator 20 to detect its zero cross points and to obtain its original pulse durations. The demodulated signal is stored, in the memory 21. When the signal stored e.g. the PDM digital video signal received, is read out of the memory 21, it is converted to the original analog video signal by the D/A converter 23 and supplied to the monitor 24. The digital video signal applied from the demodulator 20 is recorded on the recording and reproducing device 22.

As described above, the video signal in the transmission system is recorded during transmission. In addition, the magnetic recording and reproducing apparatus of the present invention can transmit the reproduced signal applied from the recording and reproducing device of transmitter 11 and can also transmit the reproduced signal applied from the recording and reproducing device 22 of the receiver 18 to the monitor 24.

Figure 4:
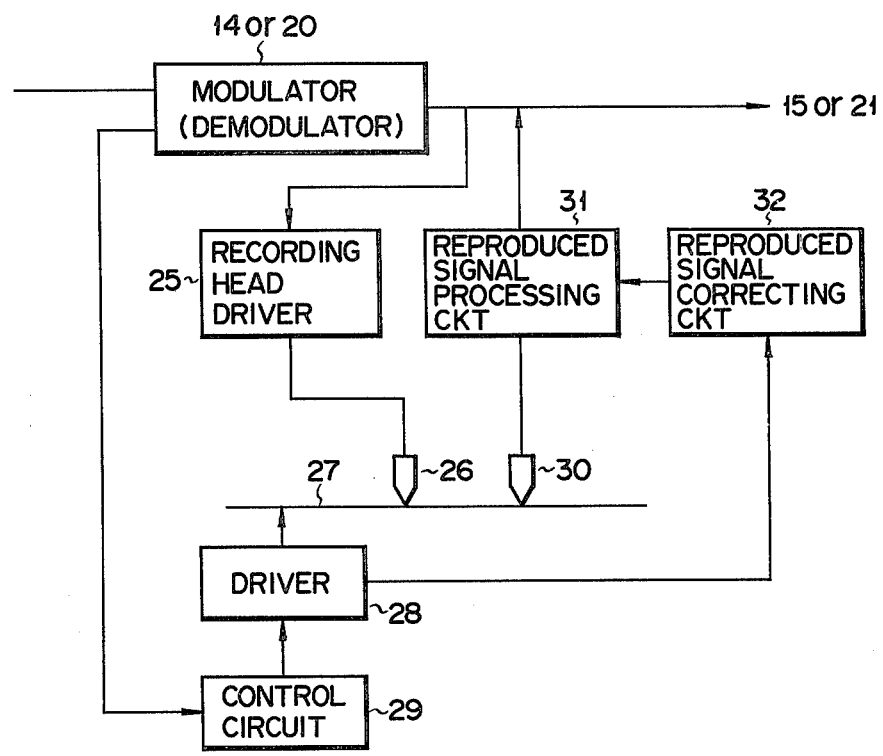
FIG. 4 is a block circuit diagram showing an example of magnetic recording and reproducing apparatus according to the present invention.

The recording and reproducing devices 16 and 22 are same in arrangement and operation and will be therefore described commonly to both of them. In FIG. 4, the output terminal of modulator 14 or demodulator 20 is connected to a perpendicular magnetic recording head 26 through a recording head driver 25. The perpendicular magnetic recording head 26 is arranged to magnetize a magnetic recording medium 27 having magnetic anisotropy whose magnetic anisotropy dispersion angle is small. The magnetic recording medium 27 is driven by a recording medium driver 28, which is connected to a control circuit 29 for controlling the speed of driver 28 synchronizing with a synchronizing signal applied from the modulator 14 or demodulator 20. A reproducing head 30 is arranged so as to reproduce the signal recorded on the recording medium 27. The reproducing head 30 is a ring head, for example. The output terminal of the reproducing head 30 is connected to a reproduced signal processing circuit 31, which is connected to a reproduced signal correcting circuit 32 in such a way that the former is controlled by the latter. The control circuit 32 serves, for example, to correct the reproduced signal read out at a higher or lower speed than in recording to have its original pulse duration and to detect the speed deviation and the like of recording medium driver 28 to correct the reproduced signal.

Figure 5:
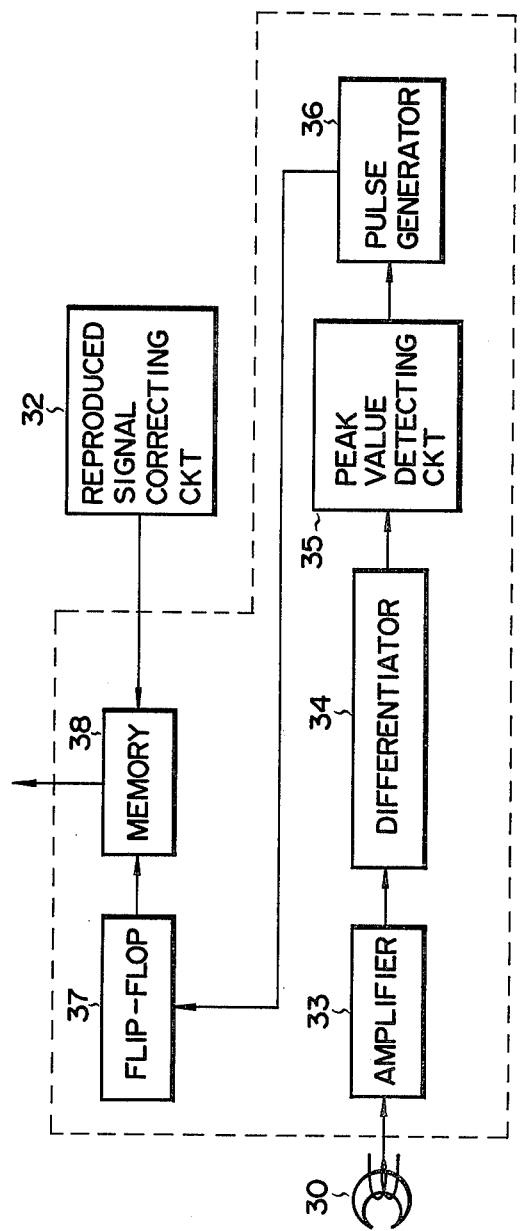
FIG. 5 is a block circuit diagram showing a reproduced signal processing circuit employed in the magnetic recording and reproducing apparatus shown in FIG. 1.

The reproduced signal processing circuit 31 has such circuit arrangement as shown in FIG. 5. Namely, the output terminal of reproducing ring head 30 is coupled to a differentiator 34 through a reading control circuit 33. The output terminal of differentiator 34 is connected to a peak value detector 35, whose output terminal is connected to a flip-flop 37 through a pulse generator 36. The output terminal of flip-flop 37 is connected to a memory 38, which is controlled in reading by a control signal applied from the reproduced signal correcting circuit 32.

When the PDM signal is supplied from the modulator 14 to the recording head driver 25 in the circuit arrangement shown in FIG. 4, for example, the PDM signal is amplified by the driver 25 so as to feed the amplified recording current to the recording head 26. The recording head 26 records the PDM signal according to the perpendicular magnetic recording method on the perpendicular magnetic anisotropy recording medium 27 which is driven by the recording medium driver 28.

In the case of reproduction, the PDM signal reproduced by the reproducing ring head 30 is supplied to the reproduced signal processing circuit 31. As shown in FIG. 5, the reproduced signal is supplied via the reading control circuit 33 to the differentiator 34 in the reproduced signal processing circuit 31. When the PDM signal recorded according to the perpendicular magnetic recording method is reproduced by the ring head, the waveform of the reproduced signal comes to have a dipulse characteristic and the point of its maximum inclination corresponds to the inversion point of magnetization. Therefore, after the reproduced signal is differentiated by the differentiator 34, its peak values are detected by the peak value detector 35. Original pulse positions are reproduced from these peak values. Responsive to the peak value signal applied from the peak value detector 35 which detects peak values, the pulse generator 36 generates a pulse and supplies it to the flip-flop 37. A pulse train in a pulse duration of the PDM signal is reproduced by the flip-flop 37. However, this reproduced signal includes an error due to the rotating wow of the recording medium driver, the difference in reading speed, and the like. For the purpose of eliminating this error, the reproduced signal is once stored in the memory 38, controlled in reading by the control signal applied from the reproduced signal correcting circuit 32 and reproduced to the original PDM signal.

As described above, the present invention enables a signal pulse-modulated in analog manner like the PDM signal to be recorded directly on the recording medium according to the perpendicular magnetic recording method, pulse positions of recording and reproducing signal to be accurately held, and the quality of the signal transmitted to be enhanced in the transmission of the still video signal.

A ring head is used as the reproducing head in the illustrated embodiment of the present invention, but a perpendicular magnetic recording head may be employed. The differentiator in the reproduced signal processing circuit can be omitted in this case.

What is claimed is:

1. A magnetic recording and reproducing apparatus comprising:
   means for converting an analog input signal to a digital signal;
   means for pulse-duration-modulating said digital signal to produce an original pulse-duration-modulated signal, said original pulse-duration-modulated signal not being on a carrier signal;
   a magnetic recording head for recording said original carrierless pulse-duration-modulated signal on a recording medium of perpendicular magnetic anisotropy wherein said recording head perpendicularly magnetizes the recording medium in correspondence with said original pulse-duration-modulated signal;

a reproducing head for reproducing the pulse-duration-modulated signal recorded on said recording mdium by said recording head;

a differentiator coupled to said reproducing head for differentiating the pulse-duration-modulated signal reproduced by said reproducing head and for futher providing a differentiated signal having peak values;

a peak value detector coupled to said differentiator for detecting the peak values of the differentiated signal from said differentiator and for generating a peak value signal; and means coupled to said peak value detector for modulating said peak value signal generated by said peak value detector to obtain the original pulse-duration-modulated signal.

2. The magnetic recording and reproducing apparatus of claim 1 wherein said demodulating means comprises:

a pulse generator for generating a pulse signal responsive to said peak value signals, said pulse signal having a pulse width corresponding to that of the original pulse-duration-modulated signal;

a pulse train generator coupled to said pulse generator for generating a pulse train corresponding to the pulse width of the original pulse-duration-modulated signal; and means coupled to said pulse train generator for storing said pulse train of said pulse train generator.

3. The magnetic recording and reproducing apparatus of claim 1 which further includes correction means for removing an error signal contained in the pulse-duration-modulated signal as reproduced by said reproducing head.

4. The magnetic recording and reproducing apparatus of claim 1 wherein said reproducing head is a ring head.

5. The magnetic recording and reproducing apparatus of claim 1 wherein said demodulating means comprises:

a pulse generator coupled to said peak value detector for generating a pulse signal in response to said peak values, said pulse signal having a pulse width corresponding to that of the original pulse-duration-modulated signal; and pulse train generating means coupled to said pulse generator for generating a pulse train corresponding to the pulse width of the original pulse-duration-modulated signal.

6. The magnetic recording and reproducing apparatus of claim 5, further comprising:

a memory coupled to said pulse train generating means for storing said pulse train of said pulse train generating means;

a source of a correction signal; and means for reading out said pulse train in response to said correction signal for correcting a reproducing error.

* * * * *